United States Patent [19]

Hiskes

[11] 4,424,004
[45] Jan. 3, 1984

[54] END CAP FOR A ROTOR SHAFT OF A ROTARY MACHINE

[75] Inventor: David J. Hiskes, Vernon, Conn.

[73] Assignee: United Technologies Corporation, Hartford, Conn.

[21] Appl. No.: 319,861

[22] Filed: Nov. 9, 1981

[51] Int. Cl.³ .............................................. F01D 11/00
[52] U.S. Cl. ........................... 416/244 A; 416/198 A; 416/200 A; 416/248; 220/327; 220/328; 138/89
[58] Field of Search .......... 416/198 A, 200 A, 201 R, 416/248; 29/526 R; 220/327, 328, 323, 325; 285/DIG. 2; 138/89

[56] References Cited

U.S. PATENT DOCUMENTS

| | | | |
|---|---|---|---|
| 1,174,278 | 3/1916 | Prier | 220/327 |
| 1,198,166 | 9/1916 | Stoddard | 220/327 |
| 3,134,535 | 5/1964 | Maier | 416/198 A |
| 4,188,675 | 2/1980 | Ast | 138/89 |
| 4,203,686 | 5/1980 | Bowman | 285/DIG. 2 |
| 4,239,124 | 12/1980 | Inouye | 220/328 |

Primary Examiner—Stephen Marcus
Assistant Examiner—Kwon John
Attorney, Agent, or Firm—Gene D. Fleischhauer

[57] ABSTRACT

A hollow rotor shaft 34 having a bore 36 sealed by an end cap 40 is disclosed. The end cap abuttingly engages a first side 42 and second side 44 on the shaft which extend radially inwardly into the bore of the shaft. The sides face in opposite directions and are oriented in a generally axial direction. The end cap includes at least one dog 48, a cover 46 pressed tightly against the first side by the rotatable dog and a lock means such as the bolt 50. The dogs are rotatable to a first position during insertion and rotatable to a second position during assembly by the lock means which extends through the cover to permit assembly and disassembly of the end cap from the exterior of the rotor shaft. In one embodiment a gasket 72 is trapped between the side of the shaft and the cover by the side of the shaft and the cover.

13 Claims, 6 Drawing Figures

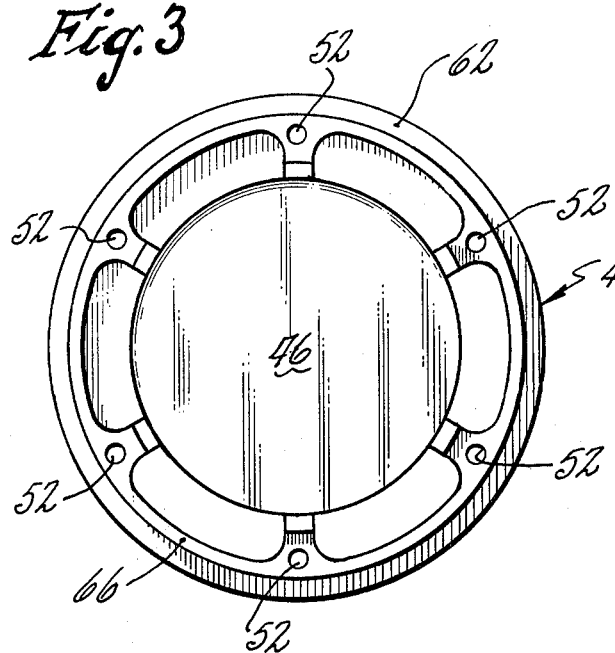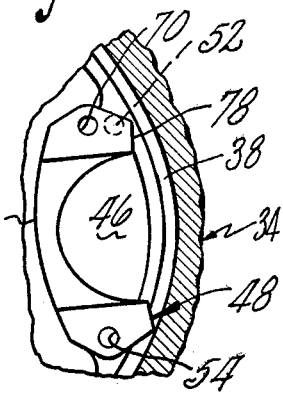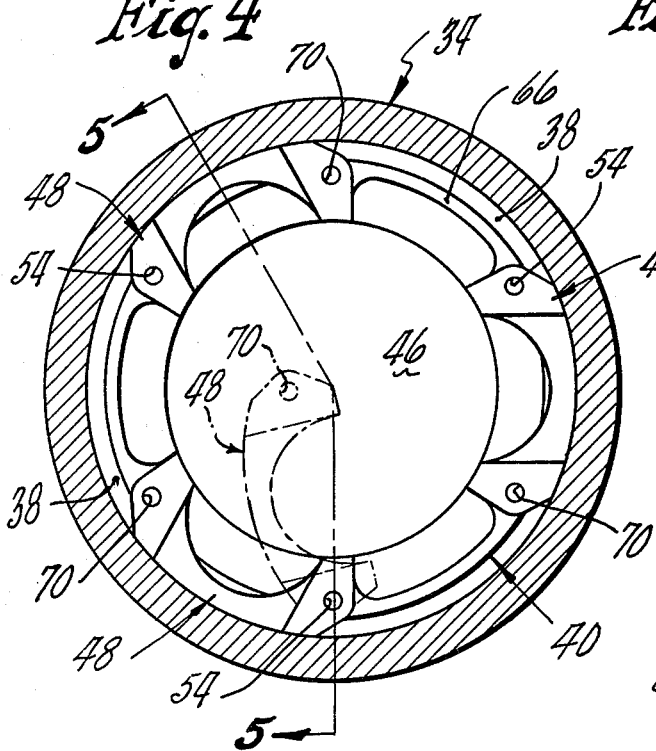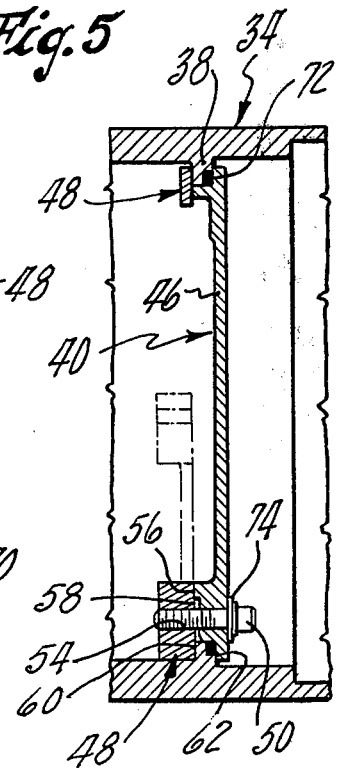

END CAP FOR A ROTOR SHAFT OF A ROTARY MACHINE

DESCRIPTION

1. Technical Field

This invention relates to rotary machines and in particular to an end cap for the rotor shaft of such a rotary machine.

2. Background Art

Rotary machines such as gas turbine engines have a turbine section and a compression section both of which have rotating and stationary components. The rotating components form a rotor assembly which includes an axially extending rotor shaft having a bore to decrease the weight of the shaft. An unobstructed bore places portions of the turbine section in fluid communication with portions of the compression section such as the nose cone and the rotor disks of the first stage of the compression section.

The fluids, such as gases, which might otherwise move through the shaft to the nose cone portion of the engine and cause corrosion and thermal gradient problems are blocked from proceeding through the shaft by an end cap. End caps such as a threaded plug, analogous to the threaded plug shown in U.S. Pat. No. 2,622,417 issued to Brown et al entitled "Shaft for Gas Turbines and the Like", might have utility in shafts where the stress concentrations caused by the threads do not adversely affect the low cycle fatigue life of the shaft. Another approach might be to bolt the end cap directly to the shaft using holes drilled and tapped in the shaft to receive bolts extending through the end cap. Stress concentrations result from the presence of these threaded holes in the shaft. The stress concentrations increase the level of stresses in the shaft. Differences in thermal growth between the shaft and the cover increase these stresses because the bolts affix the cover to the shaft. The level of the stresses decreases the fatigue life of the cover and, after structural failure of the cover, the sealing effectiveness of the cover.

Accordingly, scientists and engineers are seeking to develop an end cap which is installed from the exterior of the shaft in the end of the shaft and yet which accommodates relative thermal growth between the end cap and the shaft and which provides a sealing force to block the flow of fluids from the turbine section of the engine through the rotor shaft of the engine.

DISCLOSURE OF INVENTION

According to the present invention, an end cap for a hollow rotor shaft has a cover and dogs rotatable between two positions by a lock at each dog, the first position enabling engagement of a side of the shaft by the cover and an opposite side by the dogs wherein each lock extends through the cover to rotate the dog into the first position and thereafter to apply an axially directed force to the dog and the cover and extends through the cover to rotate the dog into a second position to enable removal of the end cap from the shaft.

In accordance with one embodiment of the present invention, a gasket is trapped between the cover of the end cap and the lip of the shaft.

A primary feature of the present invention is an end cap for a rotor shaft. The end cap is formed of a cover and rotatable dogs that engage oppositely facing, radially extending sides on the shaft. Another feature of the present invention is a locking means extending through the cover for rotating the dogs into an insertion position and into an assembly position. In one particular embodiment a gasket is trapped between the cover of the end cap and the radially extending side of the shaft.

A primary advantage of the present invention is avoidance of corrosion, thermal fatigue and the loss in efficiency which is a result of the flow of cooling air from the rear stages of the turbine to the nose cone cavity of the aircraft through the hollow rotor shaft. Another advantage is the sealing function provided by the end cap and the accommodation of relative movement between the rotor shaft and the end cap due to differences in thermal expansion between the shaft and the end cap. Another advantage is the ease of assembly and disassembly which is provided by the lock means which permits rotation of the dogs into a first position and to a second position to enable assembly and disassembly from one side of the rotor shaft.

The foregoing, and other objects, features and advantages of the present invention will become more apparent in the light of the following detailed description of the preferred embodiment thereof as shown in the accompanying drawing.

BRIEF DESCRIPTION OF DRAWINGS

FIG. 3 is a view taken along the lines 3—3 of FIG. 7;

FIG. 4 is an enlarged cross-sectional view taken along the lines 4—4 of FIG. 1;

FIG. 5 is a cross-sectional view taken along the lines 5—5 of FIG. 4;

FIG. 6 shows a portion of the cover of the end cap and a rotatable dog in a misaligned position illustrating a fail proofing feature of this particular embodiment;

FIG. 7 is a partial perspective view taken of the rotor shaft and end cap with a portion of the rotor shaft broken away and two of the rotatable dogs removed from the cover of the end cap for purposes of illustration.

BEST MODE FOR CARRYING OUT THE INVENTION

Figure 1:
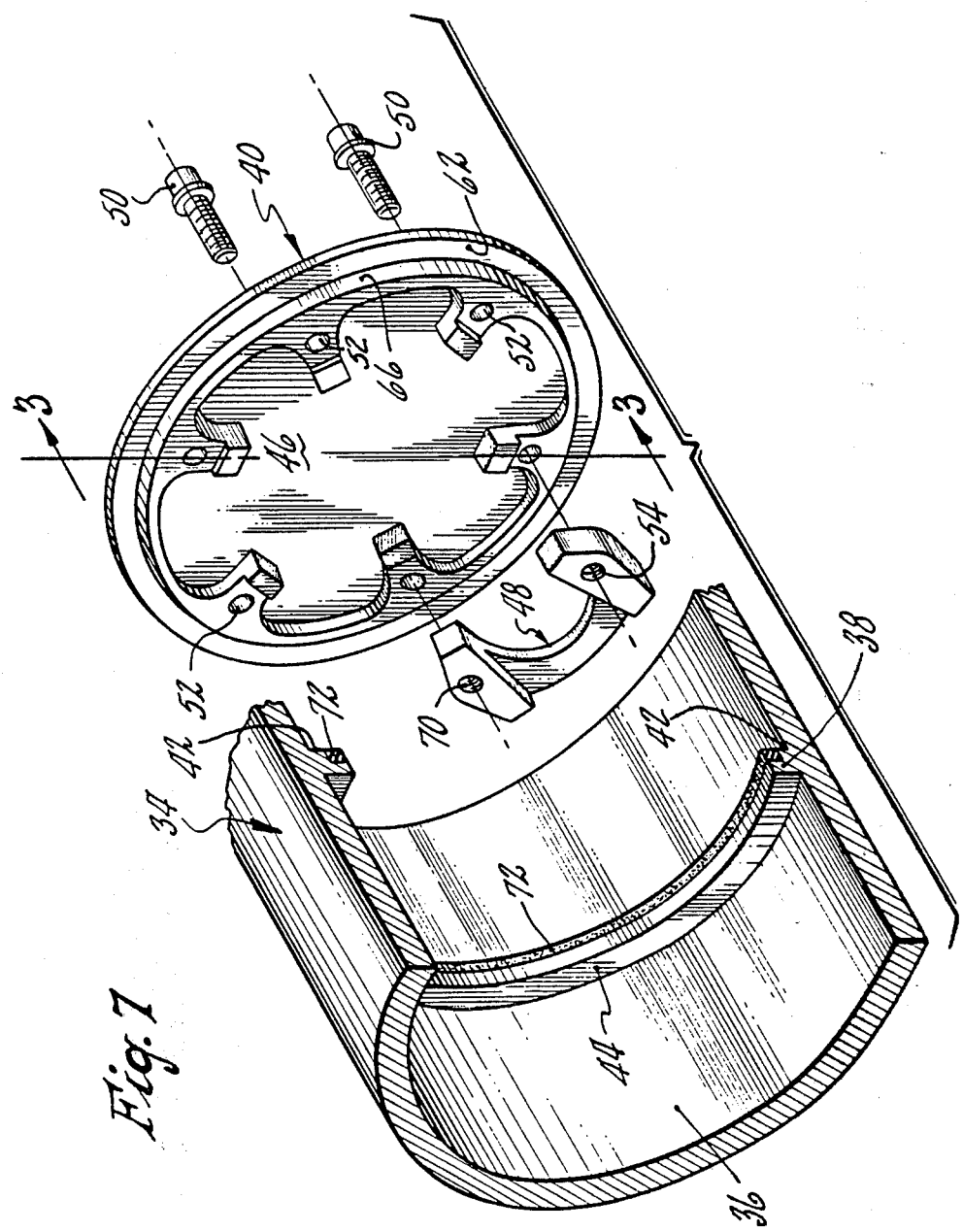
FIG. 1 is a side elevation view of an axial flow gas turbine engine with an aft portion of the turbine case broken away to show the rotor shaft and an end cap and a forward portion of the engine broken away to show a rotor disk-blade assembly and a nose cone cavity.

A gas turbine engine embodiment of the invention is illustrated in FIG. 1. The principal sections of the engine include a compression section 10, a combustion section 12 and a turbine section 14. An annular flow path 16 for working medium gases extends axially through these sections of the engine. An outer case 18 extends axially about the engine to circumscribe the flow path for hot working medium gases. A rotor assembly 20 extends axially through the engine. In the turbine section of the engine, the rotor assembly includes a plurality of rotor disks 22. Arrays of rotor blades, as represented by the single rotor blades 23, extend outwardly at each rotor disk into proximity with the outer case. Arrays of stator vanes, as represented by the single stator vanes 24, extend inwardly from the outer case into proximity with the rotor disks. In the compression section a rotor disk 26 bounds the inner portion of the annular flow path for working medium gases. An array of rotor blades, as represented by the single rotor blade 28, extends outwardly from the disk across the working medium flow path. An elliptical nose cone 30 is attached to the rotor disk 26 and extends forwardly to provide a transition piece for the approaching flow. The interior of the nose cone is spaced from the rotor disk leaving a cavity 32 therebetween.

The rotor assembly includes a rotor shaft 34 extending axially through the engine. The rotor shaft has an axis of symmetry $A_r$ and is joined to the rotor disk 26 and the rotor disk 22. The rotor shaft has a bore 36 which is in fluid communication with the cavity 32. The bore extends rearwardly through the rotor shaft to the turbine section of the engine. The turbine section has a cavity 37 in fluid communication with a source of hot, moisture laden gases. The rotor shaft has a circumferentially continuous lip 38 which extends radially inwardly from the rotor shaft into the bore of the shaft. An end cap 40 engages the continuous lip interrupting fluid communication between the cavity 37, the bore of the shaft and the cavity 32.

Figure 2:
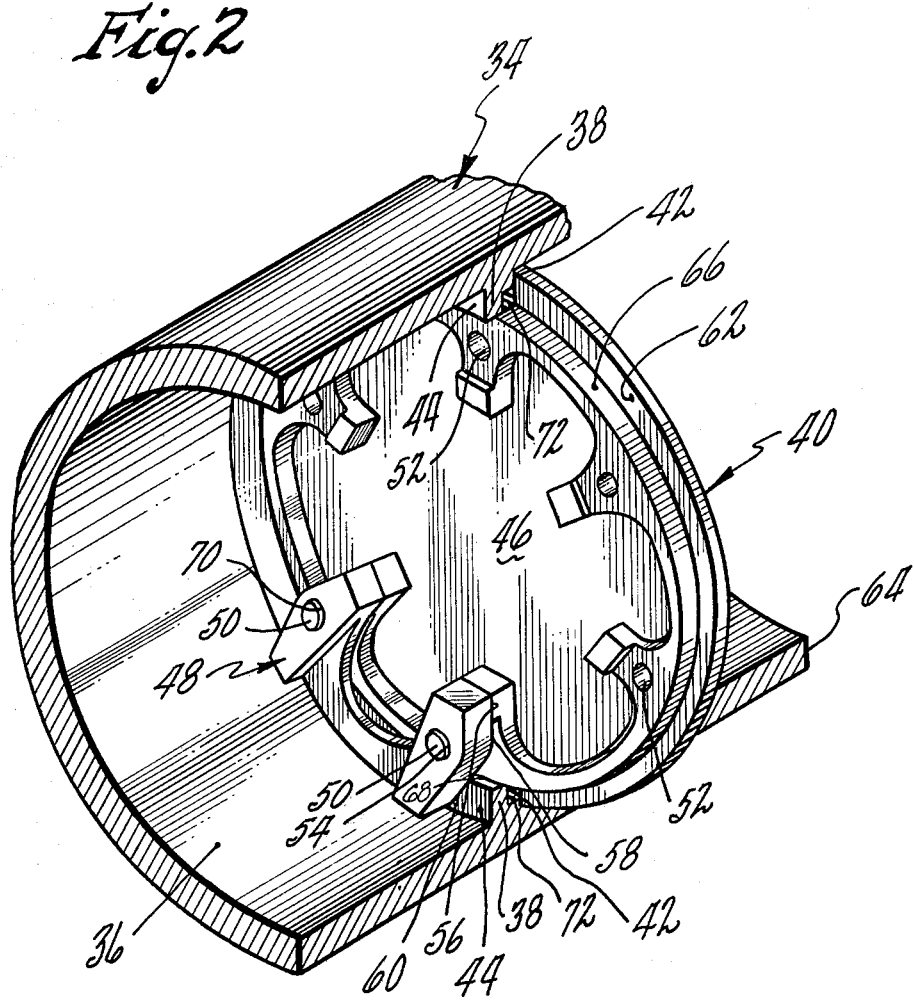
FIG. 2 is a partial perspective view from the interior of the rotor shaft of the end cap with a portion of the shaft broken away and sectioned to show a rotatable dog in the locking position.

FIG. 2 is a partial perspective view of the rotor shaft 34 from the interior of the rotor shaft with a portion of the rotor shaft broken away to show the end cap 40 and the continuous lip 38. The continuous lip has two sides, as represented by the first side 42 and the second side 44, which face in opposite, generally axial directions. The end cap includes a cover 46 adapted to face one side of the lip, and at least two dogs, as represented by the single dog 48. Each dog is spaced axially inwardly from the cover and faces the second side of the lip in the assembled position. A lock means, such as the bolt 50, extends from the exterior of the cover through a hole 52 in the cover to engage an associated threaded hole 54 in the dog. Each dog has a radially inner portion 56 axially abutting the cover, a middle portion 58 spaced axially from the cover, and a radially outer portion 60 axially abutting the lip.

FIG. 3 is a front elevation view of the cover 46 taken along the lines 3—3 of FIG. 7. The cover has six equally spaced holes 52 each permitting the insertion of a single threaded bolt. The cover is adapted by a circumferentially continuous surface 62 to engage the first side 42 of the lip 38 on the shaft.

As will be realized the surface 62 might engage a side corresponding to the first side on the end of the shaft such as the side 64 shown in FIG. 2. The cover has a shoulder 66 extending axially which is adapted to engage a radially inwardly facing surface 68 on the shaft to radially position the cover with respect to the lip.

FIG. 4 is a cross-sectional view of the rotor shaft taken along the lines 4—4 of FIG. 1 showing the end cap 40 assembled to the inwardly extending lip 38 of the rotor shaft 34. The end cap includes three identical dogs 48. Each dog has a threaded hole 54 and a threaded hole 70 which adapt the dog to receive a bolt 50 at each hole. Each of the holes 54 is contoured for resisting with a first torque the insertion of the bolt for a first distance and resisting with a second torque the insertion of the bolt for a second distance. The means for contouring the hole might be the pitch of the threads or a selflocking insert disposed in the forward portion of the hole. One insert found to be satisfactory is a selflocking helical coil insert available from the Mite Corporation, Heli-Coil Products Division, Danbury, Conn., referred to as a Heli-Coil Screw Lock Insert No. 3591. Alternatively, the bolt might be contoured to produce the change in torque. Each dog faces the second side of the lip in a first position which is shown in FIG. 4. Each dog is adapted, with one of the retaining bolts removed, to be rotated into a second moved position shown with broken lines. The second position is radially inwardly of the lip and in the second position each dog faces only the cover. With each of the three dogs oriented in the second position, the cover may be inserted or removed from the rotor shaft without interference between the dogs and the lip.

FIG. 5 is a cross-sectional view of the rotor shaft taken along the lines 5—5 of FIG. 4. A circumferentially continuous gasket 72 is trapped between the cover 46 and the lip 38 by the cover and the lip. As will be realized sealing may be provided solely by the engagement between the circumferentially continuous surface 62 on the cover and the first side 42 of the continuous lip. The gasket provides a second seal between the cover and the lip. A flat washer 74 trapped between the cover and the head of the bolt 50 provides a seal between the cover and the bolt. A seal might be provided simply by the head of the bolt engaging the cover. The threaded bolt and the dog are adapted to resist with a first torque the insertion of the bolt for a first distance and to resist with a second torque the insertion of the bolt for a second distance. The second torque is greater than the first torque and is greater than the frictional force between the dog and the lip during assembly enabling rotation by the bolt of the circumferentially extending dog from the second position, which the dog assumes during insertion, into the first position for assembly.

FIG. 6 illustrates a portion of the cover 46 and retaining lip as shown in FIG. 4 but with the dog installed in an incorrect position to illustrate a foolproof feature of the dog. As shown in FIG. 6 the dog has a convex side 76 and a concave side 78. The distance from the axis of each hole to the convex side is less than the distance from the axis of the hole to the concave side. Accordingly with the dog installed in a misaligned position during assembly, the unbolted hole in the dog is not in alignment with the hole in the cover and the bolt cannot be inserted to engage the dog.

FIG. 7 is a partial perspective view of the rotor shaft 34 with a portion of the shaft broken away and sectioned and a perspective view of the end cap 40 during assembly of the end cap to the rotor shaft. Only one dog is shown in order to simplify the drawing. The method of installing the end cap includes the steps of (1) inserting at least one lock means such as the bolt 50 through the cover for each dog; (2) attaching a rotatable dog to the lock means; (3) aligning the cover with a circumferentially continuous lip extending radially inwardly from the rotor shaft, the lip having two sides which face in opposite generally axial directions; (4) moving the cover to the lip; (5) rotating each dog into an insertion position such that each dog faces only the cover as shown in FIG. 4 as the moved position of the dog; (6) inserting each dog axially beyond the lip as shown in FIG. 5 as the moved position of the dog; (7) rotating each dog into an assembly position by rotating the lock means at the exterior of the cover such that the dog faces the cover and one side of the lip and the cover faces the dog in the other side of the lip as shown in FIG. 4 as the unmoved position of the dog; (8) applying oppositely directed axial forces through the lock means, such as by tightening the bolt, against the dog and against the cover such that the dog engages one side of the lip and the cover is urged against the circumferentially continuous other side of the lip. By reason of the design of the threaded hole, the bolt requires a torque for insertion that is smaller than a first torque for a first distance and requires a second torque that is greater than the first torque for inserting the bolt the second distance. As the bolt is tightened down to apply oppositely directed axial forces through the lock means, the bolt is torqued to a torque which exceeds a third torque causing the dog to press tightly against the inner diameter surface of the rotor shaft and to exert predetermined axial force against the lip and the cover.

During operation of the gas turbine engine, working medium gases are compressed in the compression section 10, burned with fuel in the combustion section 12 and expanded through the turbine section 14 to do work on the rotor assembly and to provide a high pressure exhaust gas. Energy is transmitted through the rotor shaft 34 to the compression section of the engine by rotation of the shaft about its axis $A_r$. The frictional forces resulting from the axial force exerted by the lock means 50 which press the dog 48 and the cover 46 against the inwardly extending lip 38 prevent the cover from moving circumferentially with respect to the rotor shaft as the shaft rotates. As heat is transferred from the working medium gases to the rotor assembly and to the rotor shaft, differences in thermal expansion between the rotor shaft and the end cap cause relative radial growth between the rotor cover and the rotor shaft. The frictional force between the end cap 40 and the rotor shaft is small enough to enable the rotor shaft to move radially with respect to the end cap without causing damage to either the dog or the end cap. The axial force provided by the lock means is large enough to enable the cover of the end cap to exert a sufficient sealing force against the gasket and against the lip on the shaft to block the passage of high pressure working medium gases through the bore 36 of the shaft to the nose cone cavity 32 of the engine. The middle portion 58 of the dog is spaced axially from the cover to cause the dog to engage the cover and the lip at two radially spaced apart locations on the dog. The spacing decreases tilting of the dog resulting from tolerance variations between the dog, the lip and the cover and associated stress levels in the dog and the lock means caused by the tilting.

During insertion, assembly, disassembly and removal of the end cap from the rotor shaft, the design of the end cap enables release of the lock means which applies the axial force and rotation of the dogs to the moved position shown in FIG. 4 and FIG. 5 with access from only one side of the cover.

Although the invention has been shown and described with respect to preferred embodiments thereof, it should be understood by those skilled in the art that various changes and omissions in the form and detail thereof may be made therein without departing from the spirit and the scope of the invention.

I claim:

1. A method of installing an end cap formed of a cover and at least two rotatable dogs to the rotor shaft of an axial flow gas turbine engine, the shaft having an axis extending in an axial direction, a first circumferentially continuous side which extends radially inwardly from the rotor shaft and which faces in a first, generally axial direction and further having a second side facing in a direction which is opposite to said first direction, comprising the steps of:

inserting at least one lock means through the cover for each dog;

attaching a rotatable dog to the lock means;

aligning the cover with said first circumferentially continuous side;

moving the cover to the first side;

rotating each dog into an insertion position such that each dog faces only the cover;

inserting each dog axially beyond the second side;

rotating each dog into an assembly position by rotating the lock means at the exterior of the cover such that the dog faces the cover and the second side of the shaft and the cover faces the dog and the first side of the shaft; and, applying oppositely directed axial forces through the lock means against the dog and against the cover such that the dog engages the second side of the shaft and the cover is urged against the first, circumferentially continuous side of the shaft.

2. The method of installing an end cap of claim 1 wherein the step of attaching a rotatable dog to the lock means includes the step of inserting a threaded bolt into a threaded hole in the dog with a torque that is smaller than a first torque for a first distance and inserting the bolt a second distance with a second torque that is greater than the first torque.

3. The method of installing an end cap of claim 2 wherein the step of applying oppositely directed axial forces through the lock means includes the step of torquing the threaded bolt until the torque exceeds a third torque causing the dog to press tightly against the inner diameter surface of the rotor shaft and to exert a predetermined axial force against the second side and the cover.

4. The method of installing an end cap of claim 3 wherein the step of rotating each dog into an assembly position includes the step of aligning a second hole in each dog with a respective hole in the cover and the step of applying oppositely directed axial forces includes the step of inserting a threaded bolt through the hole in the cover, engaging the second hole in dog, and torquing the bolt to a preselected value.

5. For a gas turbine engine of the type which includes a rotor shaft having an axis of symmetry and a bore through the interior of the shaft, the improvement which comprises:

a first circumferentially continuous side which extends radially inwardly from the rotor shaft into the bore and a second side which faces in an opposite, generally axial direction with respect to the first side; and an end cap for covering the bore of the rotor shaft which includes a cover adapted to face one radially extending side of the shaft, at least two dogs spaced axially inwardly from the cover, each dog facing the second side of the shaft in a first position and adapted to be rotated to a second position radially inwardly of the side such that each dog faces only the cover, and lock means at each dog extending from the exterior of the cover through the cover to engage the dog for rotating the dog between the first position and the second position and for applying oppositely directed axial forces, one force urging the cover into sealing engagement with the first side of the shaft and the other force urging the dog into engagement with the oppositely facing, second side of the shaft wherein during assembly each lock means enables rotation of an associated dog into the second position enabling insertion of the dog axially inwardly of the second side and enabling axial alignment of the cover with the first side and wherein each lock means enables rotation of the dog into the first position facing the shaft and, after rotation into the first position, each lock means exerts a sealing and locking force in the axial direction in one direction on the dog and in the opposite direction on the cover to provide a sealing engagement between the cover and the shaft and to permit assembly and disassembly of the cover to the shaft from the exterior of the shaft.

6. The improved gas turbine engine of claim 5 wherein the shaft has a lip extending inwardly into the bore, the lip having the first side and the second side.

7. The improved gas turbine engine of claim 6 wherein a circumferentially continuous gasket is trapped between the cover and the lip by the cover and the lip.

8. The improved gas turbine engine of claim 6 or claim 7 wherein each dog has a radially inner portion axially abutting the cover, a middle portion spaced axially from the cover, and a radially outer portion axially abutting the lip.

9. The improved gas turbine engine of claim 8 wherein at least one dog extends circumferentially, has a convex side radially abutting the shaft in the installed condition and has two end regions each having a threaded hole which adapts the dog to receive a lock means.

10. The improved gas turbine engine of claim 9 wherein the lock means is a threaded bolt and wherein the bolt and the dog surrounding the hole are adapted to resist with a first torque the insertion of the bolt for a first distance and to resist with a second torque the insertion of the bolt for a second distance wherein the second torque is greater than the first torque and is greater than the frictional force between the dog and the lip during assembly enabling rotation by the bolt of the circumferentially extending element of the dog into the assembly position.

11. The improved gas turbine of claim 10 wherein the dog having a convex side further has a concave side and wherein the distance from the axis of each hole in the end region to the convex side is less than the distance from the center of the hole to the concave side to ensure the dog is in the correct position during assembly.

12. The improved gas turbine engine of claim 11 wherein three identical dogs are provided and the cover has six equally spaced holes each permitting the insertion of a single threaded bolt.

13. An end cap for a hollow rotor shaft of a rotary machine engine which comprises:

a cover which is adapted by an axially facing surface to engage a first side of the rotor shaft;

a dog which is adapted to engage a second axially facing side, the second side facing in a direction opposite to the first side, each dog being rotatable to a first position enabling engagement of the dog to the second side of the shaft and rotatable to a second position to permit assembly of the cover to the shaft from the exterior of the shaft; and lock means, each of which extends through the cover to rotate an associated dog into the first position and into the second position and, after rotating of the lock means into the first position, for exerting oppositely directed forces on the cover and the dog to enable sealing and retention of the end cap during operation of the engine.

* * * * *